April 23, 1929.  E. R. HEWITT  1,709,939
APPARATUS FOR CENTRIFUGAL PURIFYING OF METALS AND THE LIKE
Filed April 7, 1923  3 Sheets-Sheet 1
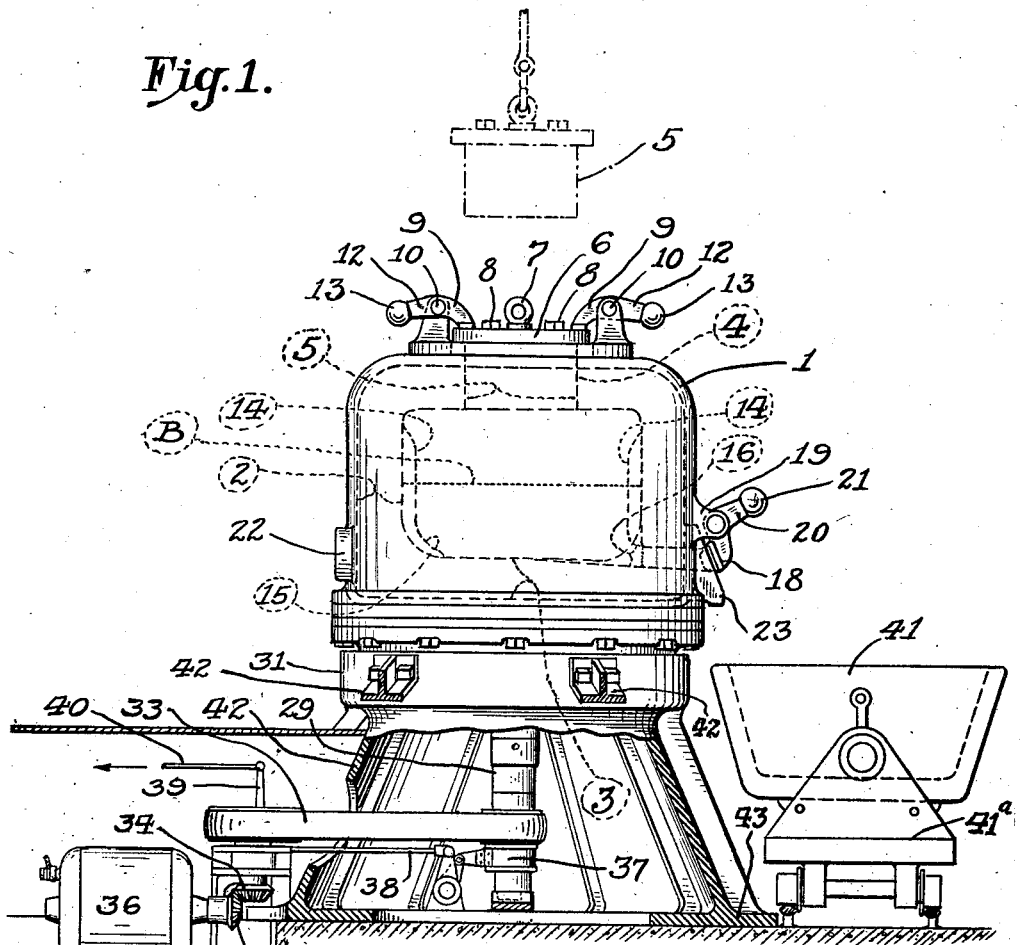
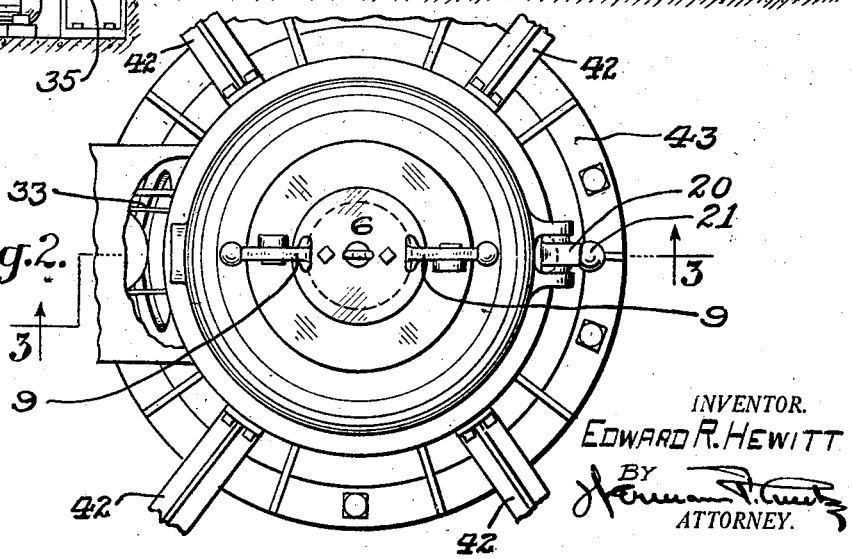
INVENTOR.
EDWARD R. HEWITT
BY
ATTORNEY.

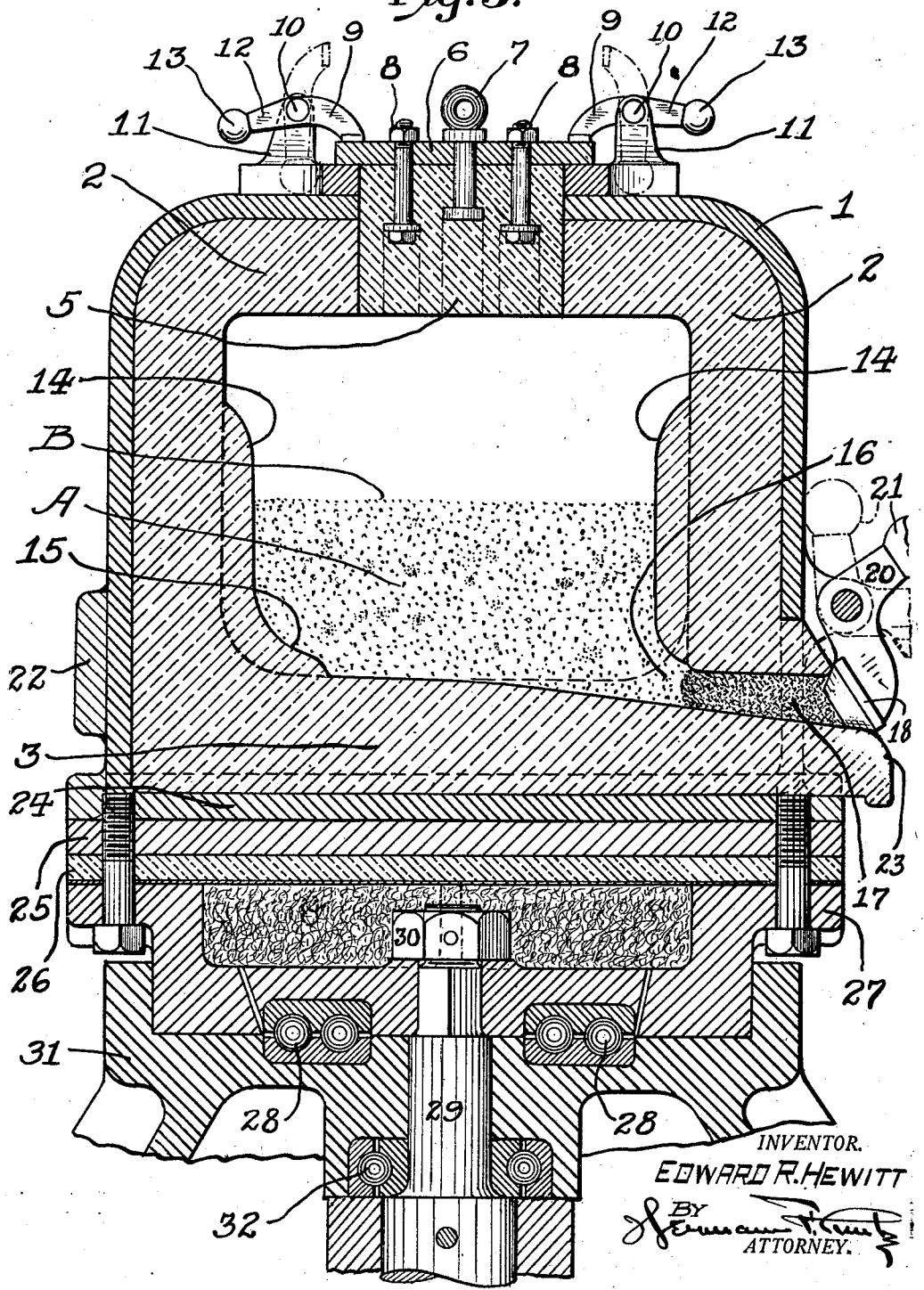

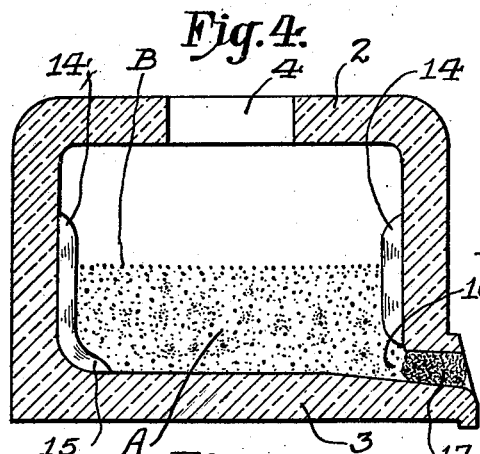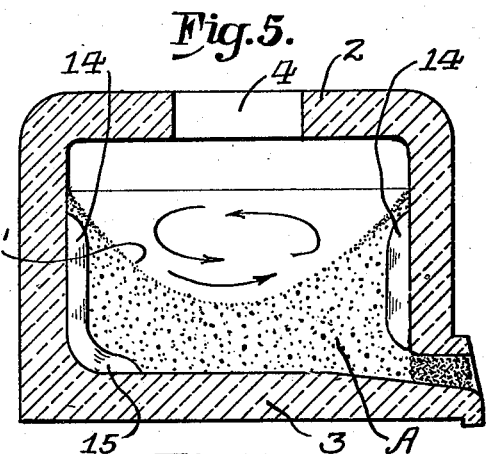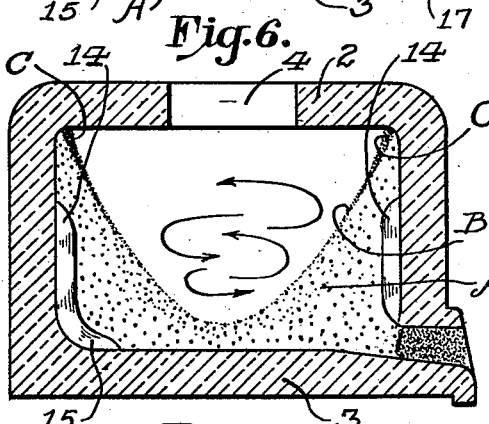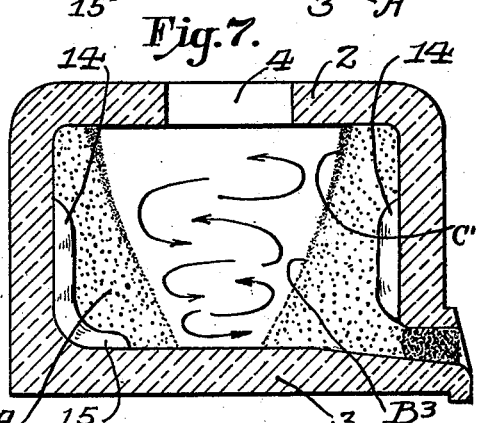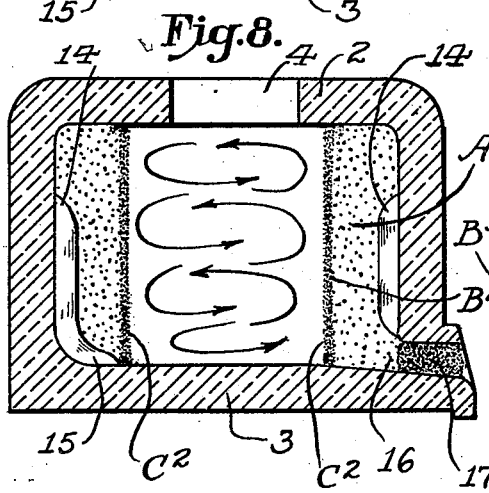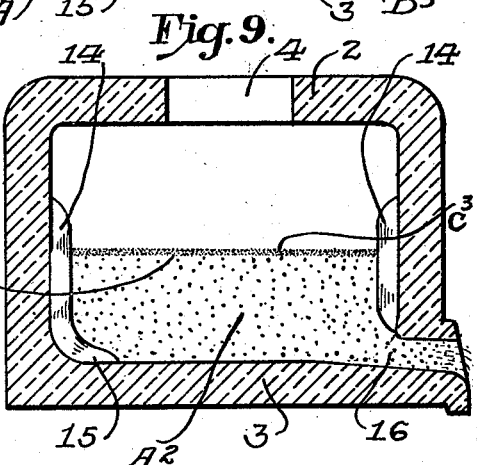

Patented Apr. 23, 1929.

1,709,939

UNITED STATES PATENT OFFICE.

EDWARD R. HEWITT, OF MIDVALE, NEW JERSEY.

APPARATUS FOR CENTRIFUGAL PURIFYING OF METALS AND THE LIKE.

Application filed April 7, 1923. Serial No. 630,428.

This invention relates to apparatus for removing impurities from a liquid, and has for its particular object the segregation or separation of foreign matter from such materials as molten metal, while the apparatus or various features of the invention may be variously used, it is particularly efficacious for the separation of non-metallic material, either particles or gas, from molten steel for the purpose of obtaining a very pure high-grade steel.

Such an apparatus particularly adapted for treatment of steel is shown in the accompanying drawings and diagrammatic views, in which:

Fig. 1 is side elevation of a rotary separator for steel.

Fig. 2 is a plan view of Fig. 1.

Fig. 3 is a vertical section on the axis, line 3—3 of Fig. 2.

Figs. 4 to 9 inclusive, represent a cross-section of the refractory lining of the rotary vessel, showing six progressive stages or steps in the operation, in which Fig. 4 shows the charge of molten steel before purifying,—Fig. 5 shows the charge at increasing speed of rotation with the surface of the molten mass assuming a paraboloid surface,—Fig. 6, Fig. 7, Fig. 8 show the progressive deformation of the surface of the molten mass up to the maximum speed of rotation of the vessel when the separation on non-metallic particles or foreign matter of lighter gravity has been effected,—and Fig. 9 shows the condition after the vessel has come to rest and the molten mass is purified with the impurities on its surface.

The rotary separator comprises the shell 1 with a heavy refractory lining 2 around the sides and extending over the top near the sides, with the bottom heavy lining 3 of refractory material, all of which lining is suitably placed and built into the casing 1. At the axis or middle of the top is an opening 4, with a cover 5 of refractory material attached to a cover-plate 6 with suitable eye 7, adapted for convenience of raising the cover, and with bolts 8 to secure the lining to the cover-plate. Suitable clamps are provided to hold the plate and cover in position, as, for example, clamps 9 pivoted at 10 to a boss 11, in such a manner that a counter-arm 12 with heavy weight 13 makes the rotation of the separator automatically apply the clamps on the ends of arms 9—9 to automatically secure the cover-plate 6.

Within the refractory lining there may be suitable ribs 14 about the sides or extending to 15 along the bottom of the crucible, so as to form irregularities on the circumferential inner surface of the refractory lining in order to effect a purchase upon the contained molten mass, and thereby transmit the rotary effect of the vessel to the liquid contents.

A suitable discharge opening 16 is provided at the bottom or below the level of the bottom adapted to be plugged in the usual manner prevalent with crucibles by a clay stopper 17, and any suitable clamping means to rigidly secure the plug 17 in position may be used. As, for example, or in addition to ordinary clamping means, a lever 18 pivoted on a boss 19 with a counter-arm 20 and a heavy-weighted end 21 provides a means which on account of the counter-weight 21 is proportioned to increase the pressure against the plug 17 with the increased speed of rotation of the separator. A counterbalance 22 of a suitable mass may be provided to counter-effect the centrifugal force of the weight of the plug lever 18—20, and the pouring lip 23 adapted to carry the discharge of molten metal radially beyond the base.

The shell 1 is preferably welded as a contiguous housing and made of heavy sheet steel adapted to resist the maximum centrifugal force involved in the operation of the machine. This shell may be made integral with the base 24 carried on a plate 25 and a heat insulation or gasket-plate 26 may be introduced thereunder to form a suitable support for bolting the superposed structure to the rotating base 27. This base 27 may have thrust bearings such as 28 to carry the load, and is secured to a shaft 29 by bolt 30 passing through the fixed base 31, while the shaft has radial bearings 32 to reduce the friction and therefore the necessary power to effect the rotation for centrifugal separation.

The shaft 29 may be driven by a belt 33 through a shaft 34 with pinion-drive 35 actuated by a motor 36. While the control of rotation is admirably effected to increase or diminish by control of the motor 36, for emergency or in some cases it may be desirable to have control of the shaft which is effected by brake 37 actuated by linkage 38—39 and operating rod 40.

When the process effected by the apparatus is complete and the rotary ladle or crucible is ready for discharging, the plug 17 is broken open in the usual manner and the liquid contents allowed to pour into the tip-ladle 41 on car 41$^a$ rolled into position in the manner usual in discharging crucibles or furnaces of molten metal.

The stationary base 31 is carried by legs 42—42 with a ground base 43 of ample dimensions to carry the weight and withstand the strains due to high rotary speed of the rotating ladle, crucible or vessel.

The operation, it will be understood from the aforegoing, consists in removing the top cover 5 and introducing a charge of molten steel which it is desired to purify, preferably filling the rotary chamber about half full. Under certain conditions the cover may be omitted from the inlet hole and as the molten metal is poured in the separator is rotated, thereby speeding up the transmission of the centrifugal force from the vessel to the molten mass. When charged at rest, the condition would be substantially as indicated part diagrammatically in Fig. 4, and as soon as the charge has taken up the speed of rotation, with constant increase of the speed the surface of the molten mass will assume more and more an acute parabolic surface as progressively shown in Figs. 5, 6 and 7, until the molten mass substantially assumes a radial position of a layer of material against the sides of the refractory lining, with a substantially cylindrical core. In this latter condition indicated in Fig. 8, being the speed of maximum rotation, the difference in specific gravity causes the non-metallic particles or gases to "rise" to the surface, which means coming readily inward out of the molten mass and segregating on the inner surface of the metal. At this stage being predetermined for the particular class of work for which the apparatus is being devoted, the operator gradually reduces the speed of rotation effecting this reduction simply so as to avoid shock, and in any event the jar or any action that would tend to cause a remixing of the lighter particles with the metal. Progressively reducing this speed until the point of rest, the segregated foreign matter on the surface will gradually rise to the horizontal surface of the molten mass at rest, thereby forming a scum with all impurities separated out of the molten mass. The purified molten metal underneath the scum is then drawn off by breaking out the plug 17 and allowing the pure molten metal to flow out of the vent 16. When all the pure metal has flown out and the scum settles to the bottom of the separator, any flow of the impurities can be diverted at the exit, or can be interrupted and disposed of in various ways. As a remnant slag it may be periodically removed from the separator or may be poured out after each pour of purified metal.

With the high speed of rotation the molten metal will, of course, tend to score or abrade whatever lining is used, and while a light lining is shown for heat resistance and to retain the heat necessary to maintain a complete liquid molten condition of the contents, the best known kind of refractory and hard lining of any kind may be used to best suit the conditions of operation. Likewise the internal surface may be made with due regard to minimize to the greatest extent the abrasion of any of the lining of the vessel so as to avoid adding any impurities to the steel from the lining.

Before the apparatus is charged the interior is heated to any extent necessary to prevent chilling of the charge, and this may be done by a suitable arrangement of torches introduced through the opening 4, or some modifications of heating more or less continuously may be used to replenish any heat losses involved in the charging or operation.

When the centrifugal effect upon the molten contents develops, the surface which is initially horizontal as B in Fig. 4, with the molten mass A containing impurities, gradually assumes a paraboloid shape $B^1$ as in Fig. 5, and then a more paraboloid form as $B^2$ in Fig. 6 with the increase of rotation, and at a point in the progressive stage some of the impurities may begin to segregate out as indicated at C. With further increase of speed the impurities will increase as at C' on the more acute paraboloid surface $B^3$ in Fig. 7. If for the given conditions of operation the speed is increased so that the centrifugal force exceeds many times the gravity of the metal, the charge will assume a position somewhat like that shown in Fig. 8 where the surface $B^4$ is substantially a cylindrical inner surface of the molten mass $A^1$, and the impurities $C^2$ will form all over the surface as their lighter gravity, by such speed many times exceeds by the centrifugal force, will more evenly distribute them over the cylindrical surface, as their radius of rotation on the inner substantially cylindrical surface of the molten metal approaches uniformity from top to bottom at such suitable higher speeds. From this condition, or whatever is the maximum speed, to the condition of rest illustrated in Fig. 9, involves a reduction or rotation which must be very gradual or even in deceleration, in order that the separated impurities are sure to maintain their surface position and not remix with the purified metal below. With proper operation this will result in the final stage of pure metal $A^2$ at the bottom as shown in Fig. 9, with a horizontal surface B⁵ on which the impurities are segregated as a scum or slag surface C³. Any suitable means is then employed to bring the separator in a position so that the spout 23 is properly located for discharge into a ladle prepared to properly receive and dispose of the purified metal as the tip-ladle 41 on a conveniently arranged truck.

By so drawing off the pure metal from the bottom all disturbance of the scum is avoided and by practical arrangements of handling the pour may be interrupted so as to leave the scum temporarily in the separator or it may be kept out of the receiving ladle by diverting it, as, for example, by turning the separator and thereby the course of the flow when the scum is reached. Suitable means for turning the separator when it is not being driven for centrifugal force of separation, can be readily applied to the base. It will also be seen that in certain arrangements of construction the driving motor may be axially aligned with the driving shaft of the separator, as illustrated in a companion application Serial No. 629,550, filed April 3, 1923, addressed to the method or process herewith involved.

While the exact speed of rotation desired to accomplish the results of the process, may vary dependent upon the size of the batch or charge, and with the size of the rotating parts and their weight, under certain conditions it may be desirable to mount the separator so that it would be driven by peripheral drive of belt or gear and provide modified forms of support better adapted under certain conditions for the carrying of the weight and durability in operation. In any design of apparatus, care must be taken to assure a control which particularly provides for a quiet or smooth decleration after the separation has been completed. With this the matter of the rotating mass is a question of the structural design and the best available material for lining may be made of relatively thinner section and more durability with other advantages, than ordinary refractory lining generally used in furnaces.

Should it be desired to operate with a batch or charge occupying a greater proportion of the contents of the separator than herein illustrated, the closure at the top will be so arranged as to prevent any spilling of the material through the charging opening. Thus with a substantial diminution of the diameter of the surface formed at top speed of the separator, the centrifugal effect on the impurities relative to the metal will vary, and this as well as the mass dimensions, will be so designed as to produce the desired centrifugal force throughout the molten metal treated.

While particularly applicable to steel purification, the apparatus may be used in connection with iron, and may be used with other metals where similar conditions exist requiring treatment for the purpose of removal of ingredients of different specific gravities than the basic material, and under certain conditions effecting the removal of gases as well as solid matter.

Variations may be made in the design and construction of the apparatus, both as to dimensions, material and for varying strength to suit the particular conditions of any specific case, and the materials may likewise be varied to these best suited for the purpose, without departing from the spirit of my invention,—but what I claim and desire to secure by Letters Patent is:

1. An apparatus for the separation of foreign matter from metal, comprising a revoluble vessel with contiguous refractory lining on the bottom sides and around the outer portion of the top, an opening in the middle of the top of said vessel adapted for the introduction of molten metal, anti-friction means of support for the bottom of the vessel and axially disposed separately connected means for imparting rotary motion to the vessel and means for assuring a controlled gradual diminution of speed without shock until rotation ceases, and means for drawing off the purified molten metal from the bottom of the vessel.

2. An apparatus for purifying steel, comprising a crucible with refractory lining substantially circular about a vertical axis, a revoluble support for said crucible axially coincident with the vertical axis of the lining, a top having an inner refractory lining contiguous with the walls of the crucible and having a central opening, and a refractory lined closure for said opening, and means for revolving said crucible on its axial support.

3. An apparatus for purifying steel or the like, consisting of a crucible shell having a circular cross-section about a vertical axis, refractory lining throughout the interior of said shell, a revoluble support for said crucible to revolve about the axis of the crucible, a cover having inner refractory lining contiguous with the wall of the crucible and having a central opening, a readily removable refractory lined closure for said opening, means for revolving the crucible on its axis, and means to draw off the purified molten metal from the crucible.

4. A crucible for centrifugal separation of impurities in steel, consisting of a rotatable base and controlled means for rotating the same, a refractory inner lining contiguous throughout the bottom, sides and the outer annular portion of the top of the crucible, and anti-friction support for the bottom of the crucible and heat insulation between the same and the body of the crucible and means on the bottom of the crucible for transmitting rotation of the crucible to a molten mass of steel admitted to the crucible through the central upper opening, and means for drawing off purified steel from below the surface of the molten mass.

5. An apparatus for separating non-metallic particles from molten metal, comprising a crucible lining with substantially cylindrical walls about an axis of rotation, means of support around the base away from the center adapted for rotation about the same axis, a shell uniformly surrounding the lining to provide a balanced condition of mass about the axis of rotation, non-load support means for rotating the apparatus on its axis and means for removing the purified metal after gradual diminution from the speed of separation to a condition of rest of the molten mass within the apparatus and a removable closure fitting an axial top opening in a crucible permitting on removal the admission of air at the top allowing the molten mass to be tapped from the bottom of the crucible.

6. An apparatus for segregating non-metallic impurities from molten metal, consisting of a crucible shell of substantially balanced construction for rotation, a refractory lining within said shell, a substantially cylindrical inner surface to said lining and irregular projections on the refractory lining bottom surface to engage contained molten metal and transmit thereto a predetermined speed of rotation, a central opening in the top of the apparatus for the inlet of molten metal, a readily removable closure therefor, and a normally closed vent adapted to be opened for the withdrawal of molten metal from below the surface when the molten metal is in a state of rest and the top closure has been removed.

7. An apparatus for purifying steel or the like, having a crucible of substantially circular horizontal cross-section with the mass of shell and refractory lining substantially uniformly balanced about a vertical axis for high speeds of revolution, means on the inside of the refractory lining to resist the relative circular flow of a contained molten mass and an annular cover extending inwardly from the top rim of the refractory lining, whereby the acceleration and deceleration of revolution of the crucible is effectively imparted in unison to the molten steel or the like being treated and the molten mass is prevented from exit from the crucible during purification.

8. A centrifugal metal purifying crucible of the character described, having a generally vertical rib on the interior lining of refractory material extending across the lowest surface of the bottom and part way up the side and an annular top lined with refractory material extending radially inward from the upper portion of the crucible to retain the entire molten mass in the crucible during treatment.

9. A crucible for the centrifugal purification of metal, having a bottom vent, a plug, means for holding said plug in position formed with supports whereby the pressure on the plug will increase with the increase of centrifugal force due to rotation of the crucible.

In testimony whereof, I have signed my name to this specification, this 28th day of March, 1923.

EDWARD R. HEWITT.